March 18, 1947.   F. V. JOHNSON   2,417,689
GYROSCOPIC DEVICE
Filed July 12, 1943
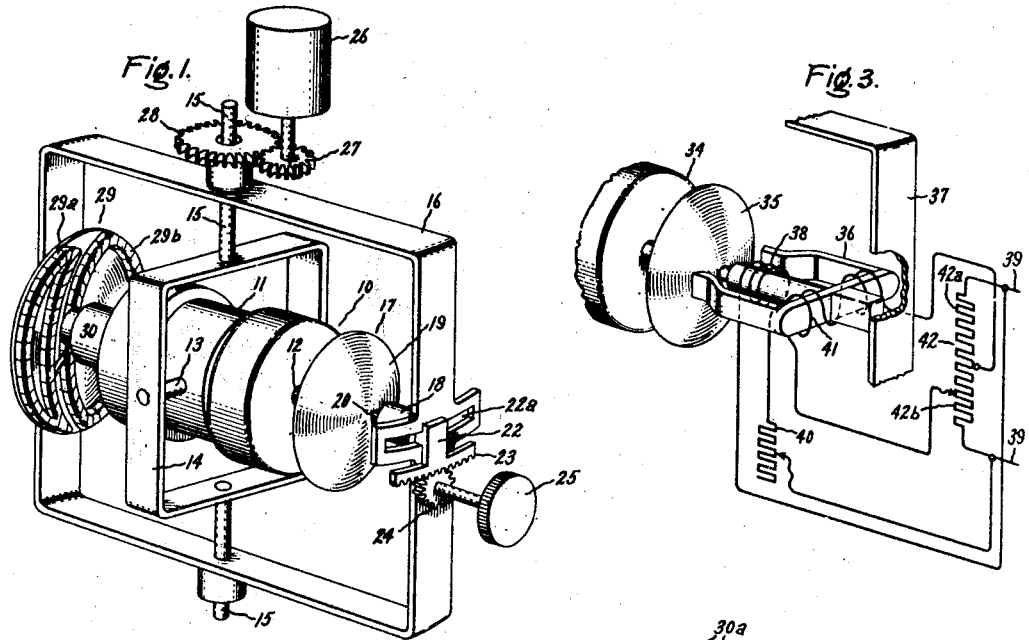
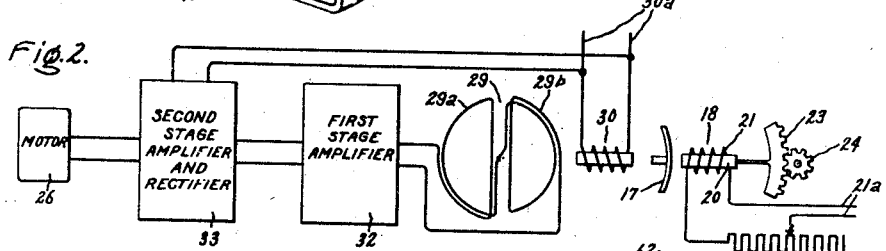
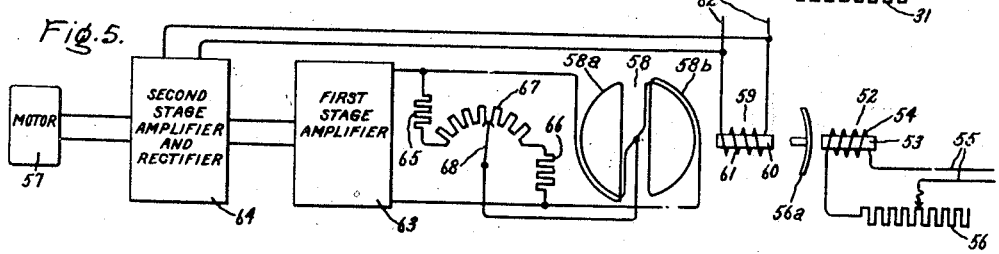
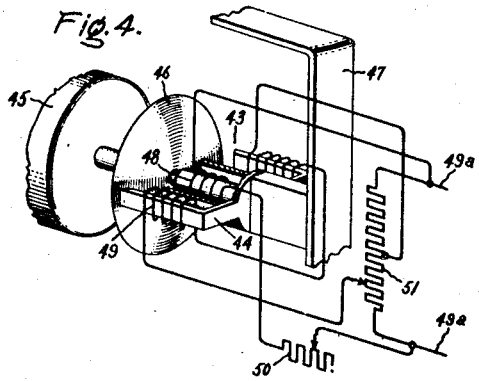
Inventor:
Frithiof V. Johnson,
by Harry E. Dunham
His Attorney.

Patented Mar. 18, 1947

2,417,689

UNITED STATES PATENT OFFICE 2,417,689

GYROSCOPIC DEVICE

Frithiof V. Johnson, Scotia, N. Y., assignor to General Electric Company, a corporation of New York Application July 12, 1943, Serial No. 494,339

4 Claims. (Cl. 74—5)

This invention relates to a gyroscopic device, and it has for its object the provision of an improved device of this character which is caused to precess in a predetermined way; and which may be used for a variety of purposes, such as to compensate for the rotation of the earth, or for the movements of a ship or other movable object with reference to the earth.

In accordance with this invention, a gyroscope is supported for freedom of motion about mutually perpendicular axes. A member is mounted to move angularly on one of these axes; and a coupling is interposed between this member and the gyroscope having coacting elements, one mounted on the gyroscope and the other on the movable member; this coupling tends to hold the gyroscope and the member together in a predetermined angular relation about this axis. Means is provided for changing the point of application of the holding force exerted between these coacting elements, and when it is so shifted a torque is applied about the other axis of the gyroscope, whereby it tends to precess to restore the original relative positions between the elements of the coupling.

In one form of this invention, the coupling comprises an eddy-current disk mounted on either the gyroscope or the movable member, and a coacting magnet mounted on the other of these two members. And in one specific form of the invention, the magnet is shiftable, whereby its flux field is shiftable so as to shift the position of the applied force between the two elements of the coupling. In another form of this invention, the magnet remains fixed on its supporting member, but its excitation is controlled to shift its flux which in effect shifts the position of the applied force between the coupling members.

Driving means are provided for driving the member about its axis of rotation, and this driving means is controlled responsively to angular displacement between the gyroscope and the member so that once the coupling force is displaced, the driving means will continuously drive the member on its axis of rotation and with a velocity dependent upon the magnitude of the displacement.

In another form of this invention, the control for the driving means of the member itself is adjustable in order to effect the displacement of the coupling force.

For a more complete understanding of this invention, reference should be had to the accompanying drawing in which Fig. 1 is a perspective view of a gyroscopic device embodying this invention; Fig. 2 is a diagrammatic representation illustrating certain of the elements of the gyroscopic device shown in Fig. 1; Fig. 3 is a fragmentary perspective view illustrating another embodiment of this invention; Fig. 4 is a view similar to Fig. 3, but illustrating still another embodiment of this invention; and Fig. 5 is a diagrammatic view illustrating another embodiment of this invention.

Referring more particularly to Figs. 1 and 2, this invention has been shown in one form as applied to a gyroscopic device used to establish a stable line of direction in azimuth, which is controlled to compensate for apparent wander due to the earth's motion about a vertical axis, and further for the motion with reference to the earth of a movable mount, such as a ship, upon which the gyroscopic device is mounted.

As shown in Fig. 1, the gyroscopic device comprises a gyroscope 10 which comprises a casing 11 within which is mounted a suitable driving motor (not shown) for driving the shaft 12 of the gyroscope. It will be understood that the axis of the shaft 12 is the spin axis of the gyroscope.

The gyroscope 10 is mounted about mutually perpendicular axes. For this purpose, it is provided with oppositely disposed shafts 13 which are mounted for rotation in a gimbal ring 14 on an axis which I will denote 13—13, and this ring 14 in turn is mounted for rotation on shafts 15, the axis of which is perpendicular to and intersects the axis of the shafts 13, and which latter axis I will designate 15—15.

In the specific application of this device referred to above, the axis 15—15 is held in a vertical position by any suitable apparatus (not shown).

Also mounted to rotate about the axis 15—15 is a member 16 in the form of a ring, as shown, and the plane of which is generally positioned at right angles to the plane of the gimbal ring 14.

Suitable coupling means are provided between the gyroscope and the member 16. This coupling means in the form of the invention shown in Fig. 1 is of the electromagnetic character comprising and eddy-current disk 17 mounted on the end of the gyroscope shaft 12, and a magnet 18 mounted on the forward vertical arm, as viewed in Fig. 1 of the member 16 in a position opposite the disk. The eddy-current disk comprises a steel core (not shown) which is fastened to the end of the shaft 12 and which has an outer curved surface approximately in the form of a segment of a sphere which has its center in the center of suspension of the gyroscope. Spun over this outer surface is a surface 19 formed of an electrically conducting material, which preferably will be made of copper. The magnet 18 has a center pole 20 about which is wound an electrical exciting winding 21, and energized from any suitable electrical source of supply such as a direct current supply source 21a, as shown diagrammatically in Fig. 2. The central longitudinal axis of the pole piece 20 passes through the center of suspension of the gyroscope.

It will be understood that the gyroscope may be provided with a gyroscope wheel housed within the motor casing 11, but preferably the eddy-current disk 17 will function also as the gyroscope wheel.

The eddy-current disk 17 and the magnet 18 constitute a coupling which applies a torque to the gyroscope which tends to precess it into alignment with the axis of the magnet. Thus, when the eddy-current disk 19 is rotating in the magnetic field set up by the magnet 18, and the axis of the gyroscope is aligned with the axis of the magnet, no eddy-currents are induced in the surface 19 which tend to apply torques to the gyroscope to precess it. However, if the axis of the gyroscope departs from the axis of the magnet, the motion of the disk in the magnetic field causes eddy-currents to flow in the copper sheet 19. A resulting magnetic force acts on the gyroscope which tends to precess it into alignment with the magnet axis. For example, if the axis of the gyroscope should be turned angularly about the axis 15—15 relative to the member 16, while the spin axis remains horizontal, an electromagnetic force will act on the surface of the disk in a vertical direction and whether it is directed upwardly or downwardly depends upon the direction of departure and the direction of rotation of the disk 19; for example, if the disk 17 be moved toward the right, as viewed in Fig. 1, and if it be rotating clockwise on its axis, as viewed in this figure, then the electromagnetic force acting upon the disk will be directed downwardly in the vertical direction. Such a force, it will be observed, will apply a torque about the axis 13—13, which torque will precess the gyroscope toward the left. In other words, it tends to bring the spin axis of the gyroscope into alignment with the axis of the magnet. The same is true for any other departure of the disk from the magnet's axis either in the vertical or the horizontal direction.

The magnitude of the restoring force varies approximately linearly with the angle of departure between the gyroscope and the magnet, and with the coefficient of coupling which is a function of the magnet's excitation current.

Relative displacement of the eddy-current disk 17 and the magnet 18 is effected in this form of the invention by shifting the position of the magnet horizontally with reference to the ring 16; and for this purpose, it is mounted upon a suitable slide 22 mounted in an elongated guideway 22a extending in the horizontal direction on opposite sides of the forward vertical arm of the ring 16, as shown in Fig. 1. The slide is provided with a rack 23 with which a spur gear 24 meshes and which gear is driven by an adjusting thumb screw 25.

Suitable means are provided for controlling the rotation of the member 16 about axis 15—15 in accordance with the angle of departure of the gyroscope from the member 16 about this axis, and which prevents the realignment of the coupling members so that it drives the ring 16 and the gyroscope with it at a speed which is proportional to the angle of departure.

This driving means comprises a direct current motor 26 which is geared to the ring member 16 through a gear 27 driven by the motor and which meshes with a gear 28 secured to the ring, the axis of the latter ring being coincident with the axis 15—15.

The motor 26 is controlled by means of a sensitive pick-up device 29 provided on the left-hand vertical arm of the member 16, as viewed in Fig. 1. The pick-up device coacts with an alternating current magnet 30 mounted on the rear end of the gyroscope, the magnetic axis of which passes through the center of suspension of the gyroscope. The sensitive pick-up 29 comprises a pair of coils 29a and 29b wound in semi-circular form, as shown in Figs. 1 and 2. The diameters of the coils, as shown, are adjacent each other, are coextensive, and are parallel to the axis 15—15. In addition to this, the center of the circle defined by the coils lies in a diameter which passes through the center of suspension of the gyroscope. The coils are reversely wound and electrically interconnected together, as shown diagrammatically in Fig. 2. The magnet 30 is energized from any suitable source of alternating current supply 30a, as shown in Fig. 2.

It will be understood that the electromagnet 30 sets up a magnetic field, the flux of which cuts the turns of the coils 29a and 29b. So long as the axis of the magnet 30 lies in the central axis of the coils, the flux interlinking the two coils induces voltages in them which are balanced. However, if the gyroscope becomes displaced about the axis 15—15 relative to the ring member 16 so as to move the electromagnet transversely across the coils, a voltage unbalance occurs in the pair of coils. This voltage unbalance induced in the coils is utilized to operate the motor 26. For example, if the magnet 30 is moved toward the right, as viewed in Fig. 1, relative to the pick-up coils, the motor 26 will be operated to turn the member 16 in the clockwise direction, whereas if the displacement be in the opposite direction, the motor will be reversed to reverse the direction of motion of the member 16.

It will be observed in view of the foregoing construction, that if the position of the magnet 18 be shifted so as to, in effect, shift the position of the electromagnetic force acting on the eddy-current disk 17, the gyroscope will tend to precess to realign the axis of the eddy-current disk with the axis of the magnet. Let it be supposed that the magnet is shifted toward the left, as viewed in Fig. 1. The gyroscope then will tend to precess in the clockwise direction to restore the initial positions of the magnet and disk. But this movement of the gyroscope will displace the magnet 30 at the rear toward the right, as viewed in Fig. 1, with reference to the center of the coils 29a and 29b. And as explained, this will induce a voltage to drive the motor 26 in such a direction that it will drive the ring 16 clockwise, and it will drive it until the axis of the sensitive pick-up coils is aligned with the axis of the magnet 30. In other words, it will drive it until the spin axis of the gyroscope coincides with the initial position of the axis of the magnet 18. But inasmuch as the magnet 18 is still displaced to the left, the gyroscope will continuously tend to shift the position of the magnet 30 to the right away from the pick-up coils, and as a result the motor 26 will be continuously operated to drive the member 16 about the axis 15—15.

And the motor 26 will drive the ring 16 continuously with a speed which is proportional to the displacement of the magnet 18. This is because, as pointed out previously, the magnetic coupling attempts to restore the axial position of the disk 19 into the axis of the magnet 18 with a force which is proportional to the angular displacement; therefore, the wider the angular displacement the greater will be the speed of the member 16 about the axis 15—15.

It will be understood that the magnet 18 will be set so as to introduce the correct velocity for the member 16. If it be desired to compensate only for the apparent wander due to the earth's motion about a vertical axis, then only this correction will be set in, but in addition if it be desired to compensate for the motion of a support, such as a ship, with reference to the earth, then this velocity correction also will be set in.

The strength of the magnetic coupling is adjusted by adjusting the excitation of the winding 21 of the magnet 18, and this is accomplished by means of an adjustable rheostat 31 connected in the energizing circuit of the winding, as shown diagrammatically in Fig. 3.

It will be further understood that should the gyroscope's spin axis tend to wander from the horizontal position, the electromagnetic coupling 17 will restore it to this position.

Any suitable system of control may be used between the pick-up coils 29 and the motor 26, but preferably the alternating current voltage will be amplified in a first stage amplifier 32, and this voltage in turn will be amplified and rectified in a second stage amplifier and rectifier 33, the output of which will be used to drive the motor 26.

For example, the control system shown in the United States patent to Albert H. Mittag No. 1,684,137, dated September 11, 1928, may be used. In this patent, the winding 19 corresponds to the magnet 30 of this application; the Mittag winding 18 corresponds to the pick-up coils 29a and 29b and the motor 12 of Mittag corresponds to the motor 26 of the application. The voltage output of the coils 29a and 29b would be amplified in the tubes 24 and 25 of Mittag, just as these tubes amplify the voltage output of the winding 18 of Mittag, and which tubes 24 and 25 correspond to the first stage amplifier 32 of this application. This amplified output in turn would be amplified and rectified in the amplifiers 35 and 36 of Mittag, which correspond to the element 33 of this application, and finally the output of the amplifiers 35 and 36 would be utilized to drive the motor 29, just as is the motor 12 of Mittag controlled by the output of the members 35 and 36. In Mittag the unbalance between the windings 17 and 18 is caused by the motion of a transmitter 14, while in this application as pointed out above, the unbalance between the magnet 30 and the coils 29a and 29b is caused by relative movement between them. Therefore, there is no element here corresponding to the transmitter 14 of Mittag; and the anti-hunting windings 60 and 61 of Mittag and their associated motors 63 would not be used. But otherwise, the motor control system of Mittag may be used here.

In the form of the invention shown in Fig. 3, the position of the electromagnet of the coupling between the gyroscope and the controlled rotatable member is not physically adjusted, but its excitation is controlled to shift its flux in order to shift the electromagnetic force applied to the eddy-current disk. Here, the gyroscope 34 operates an eddy-current disk 35 which coacts with a magnet 36 which is mounted upon a controlled driven member 37. The arrangement and construction of the embodiment illustrated in Fig. 3 is identically the same as that of Fig. 1 except for the construction and arrangement of the magnet 36 which is used instead of the magnet 18.

In Fig. 3 the magnet 36 has a generally E-shaped form having a primary winding 38 upon its central leg. This winding is supplied from a suitable direct current source of electrical supply 39, and its excitation may be adjusted by means of a rheostat 40. However, the excitation is generally maintained constant, and the force of this magnet is utilized to hold the gyroscope in its horizontal position, that is, it prevents wandering about its horizontal axis, corresponding to axis 13—13 of Fig. 1.

The change in position of the flux of the magnet in order to cause precession of the gyroscope and rotation of the controlled member 37 is controlled by means of a cross winding 41 wound upon two arms of the standard of the E, as shown in Fig. 3. This coil 41 is energized from the source 39 through a potentiometer 42. It will be observed that one end of the coil is connected to the midpoint of the resistance 42a of the potentiometer, while the other end of the coil is connected to the adjustable contact 42b of the potentiometer. When the contact 42b is in the center of resistance 42a, no flux is generated in the two arms of the core's standard. However, if the contact 42b be shifted from its central position along the resistance 42a then the coil is energized, the direction of the flux created by this excitation depending upon the direction of movement from the contact 42b from the center of the resistance. Whenever the contact 42b is thus adjusted away from the center of the resistance the cross flux generated by the cross winding 41 is added to the return flux generated by the central winding 38 passing into one of the legs of the E-shaped core and is subtracted from the flux generated by winding 38 passing into the other leg of the E. This unbalance shifts the position of the flux acting on the eddy-current disk, that is, it shifts the position of the electromagnetic force acting on the eddy-current disk. And the magnitude and direction of this shift depends upon the direction and the extent of movement of the resistance 42b from the center of the resistance 42a.

In all other respects this embodiment of the invention operates as does the first form of the invention.

The embodiment illustrated in Fig. 4 is precisely the same as the embodiment shown in Fig. 3, except that the windings on the magnet are somewhat differently arranged, and in addition to this, the electromagnet 43 having an E-shaped core is provided with a central annular return pole 44 about the central leg of the E.

Thus, the gyroscope 45 of this form operates an eddy-current disk 46 which coacts with the magnet 43. And the magnet 43 is carried by a member 47 corresponding to the member 16 of the first form and the member 32 of the second form. Also here, the central leg of the core is provided with a primary winding 48, while a secondary cross winding 49 is provided; this winding 49, however, instead of being wound upon the standard of the E is wound upon the two arms opposite the central arm, as shown in Fig. 4. Here the primary winding is energized from a direct current supply source 49a, and is controlled by an adjustable resistance 50, while the secondary winding 49 is energized from the same source and is controlled by a potentiometer 51.

The annular pole piece 44 carries most of the return flux of the winding 48 that holds the gyroscope horizontal, the two small outside poles defined by the two ends of the outside arms of the E carrying the directional flux. In this form of the invention it is found that less "drag" is placed upon the eddy-current disk in restoring it to the horizontal in case it wanders from this position.

The form of the invention illustrated in Fig. 5 is exactly the same as that illustrated in Figs. 1 and 2, except here the electromagnetic force of the coupling magnet is not controlled to effect the shift between the eddy-current disk and its magnet, but the electrical center of the pick-up coils is controlled to effect this shift.

In Fig. 5 there is shown a magnet 52 which corresponds to the magnet 18 of the first form and which is provided with a central core 53 and an exciting winding 54 energized from a direct current supply source 55 and which is controlled by means of a suitable adjustable resistance 56. This magnet coacts with an eddy-current disk 56a, which is the other element of the coupling. Here also, the driving motor 57 for the member corresponding to the ring 16 is controlled by means of a sensitive pick-up device 58 corresponding to the pick-up device 29, and which is mounted on the member corresponding to the member 16, and which coacts with an electromagnet 59 having a central core 60 and an exciting winding 61 energized from an alternating current source of supply 62. Here as before, the motor 57 is controlled in precisely the same way as is the motor 26 of Fig. 1 through a first stage amplifier 63, and a second stage amplifier and rectifier 64.

But here the electrical center of the pick-up coils 58a and 58b of pick-up device 58 is shifted horizontally in order to control the device, and when it is shifted horizontally the motor will drive the ring 16 to align the axis of the core 60 of the magnet 59 with the new electrical center, and hence, will displace the gyroscope with reference to the driving member. This necessarily shifts the position of the eddy-current disk 56a with reference to its magnet 52, and the system will, therefore, function as previously described, when such a shift of flux is effected in connection with any of the other forms of the invention.

The shift in the electrical center is effected by means of a fixed resistance 65, a fixed resistance 66, and an adjustable resistance 67 all connected together in series and in shunt across the output of the coils 58a and 58b. If the adjustment contact 68 is in the center of the resistance 66 the voltage generated in the coils 58a and 58b will in no way be modified, and the spin axis of the gyroscope will be aligned both with the center of the circle defined by the coils 58 and also will be aligned with the central axis of the magnet 52. However, if the contact 68 be moved from its central position in one direction or the other, for example in the clockwise direction, as viewed in Fig. 5, the resistance shunting the coil 58a will increase, while that shunting the coil 58b will decrease. This, in effect, shifts the electrical center of the coils to the right from its original position and, therefore, causes a departure in the angular positions of the gyroscope and the driving member, because the motor 26 will drive the driven ring member until the axis of magnet 59 is aligned with the new electrical center, and the system from then on will operate as do those of the other forms of the invention described. Thus, the motor 57 will be operated in one direction or the other depending upon the shift of the member 68 to drive the driven member continuously in azimuth.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A gyroscopic device comprising a gyroscope, means mounting said gyroscope for movement about mutually perpendicular axes, a member movable about one of said axes, an electromagnetic coupling between said gyroscope and member having an eddy-current disk on one of them and a coacting magnet on the other, said disk and said magnet being relatively rotatable, the flux generated by said magnet linking said disk and applying to said gyroscope a torque about the other of said axes tending to precess said gyroscope about said one axis toward a predetermined position relative to said member, means for angularly displacing said magnet and disk relatively to each other in the direction of said movement about said one axis, a motor for driving said member about said one axis, and control means for said motor operated responsively to relative movement between said gyroscope and member for causing said motor to drive said member.

2. A gyroscopic device comprising a gyroscope, means mounting said gyroscope for movement about mutually perpendicular axes, a member movable about one of said axes, an electromagnetic coupling between said gyroscope and member having an eddy-current disk on one of them and a coacting magnet on the other, said disk and said magnet being relatively rotatable, the flux generated by said magnet linking said disk and applying to said gyroscope a torque about the other of said axes tending to precess said gyroscope about said one axis toward a predetermined position relative to said member, said magnet having an E-shaped core, an exciting winding on the central arm of said core to generate a primary flux, an exciting winding on the other two arms of said core for generating a secondary cross flux, and means for controlling the excitation of said windings to shift the flux field in the direction of movement of said gyroscope and member about said one axis, a motor for driving said member about said one axis, and control means for said motor operated responsively to relative movement between said gyroscope and member for causing said motor to drive said member.

3. A gyroscopic device comprising a gyroscope, means mounting said gyroscope for movement about mutually perpendicular axes, a member movable about one of said axes, an electromagnetic coupling between said gyroscope and member having an eddy-current disk on one of them and a coacting magnet on the other, said disk and said magnet being relatively rotatable, the flux generated by said magnet linking said disk and applying to said gyroscope a torque about the other of said axes tending to precess said gyroscope about said one axis toward a predetermined position relative to said member, said magnet having an E-shaped core, an exciting winding on the central arm of said core to generate a primary flux, an exciting winding on the other two arms of said core for generating a secondary cross flux, and an annular flux return pole around said central arm, means for controlling the excitation of said windings to shift the flux field in the direction of movement of said gyroscope and member about said one axis, a motor for driving said member about said one axis, and control means for said motor operated responsively to relative movement between said gyroscope and member for causing said motor to drive said member.

4. A gyroscopic device comprising a gyroscope, means supporting said gyroscope for freedom of motion about mutually perpendicular axes, a member movable about one of said axes, an electromagnetic coupling between said gyroscope and said member having an eddy current disk on one of them and a coacting magnet on the other, said disk and said magnet being relatively rotatable, the flux generated by said magnet linking said disk and applying to said gyroscope a torque about the other of said axes tending to precess said gyroscope about said one axis toward a predetermined position relative to said member, a driving motor for driving said member about said one axis, control means for said driving motor responsive to displacement of said member and gyroscope from a relative angular position about said one axis for causing said driving means to drive said member about said one axis, said control means comprising an alternating current electromagnet on one of said member or gyroscope and a pair of semi-circular pick-up coils on the other positioned with their diameters adjacent each other and coextensive and parallel to said one axis, connections between said pick-up coils and driving motor to control the direction of rotation and speed of said motor in accordance with the magnitude and direction of the voltage generated in said coils by relative displacement between them and said alternating current magnet, and control means for shifting the electrical center of said coils in order to shift the relative positions of said gyroscope and member.

FRITHIOF V. JOHNSON.

REFERENCES CITED

The following references are of record in the file of this patent:

UNITED STATES PATENTS

| Number | Name | Date |
|---|---|---|
| 2,293,092 | Wittkuhns | Aug. 18, 1942 |
| 2,293,039 | Esval | Aug. 18, 1942 |
| 1,136,566 | Usener | Apr. 20, 1915 |
| 2,133,793 | Anscott et al. | Oct. 18, 1938 |
| 2,133,809 | Carter et al. | Oct. 18, 1938 |
| 2,093,503 | Wittkuhns et al. | Sept. 21, 1937 |

FOREIGN PATENTS

| Number | Country | Date |
|---|---|---|
| 359,071 | British | Mar. 6, 1931 |
| 317,946 | Italian | May 28, 1934 |